US011951051B2

(12) United States Patent
Kim et al.

(10) Patent No.: US 11,951,051 B2
(45) Date of Patent: Apr. 9, 2024

(54) LIFTING SYSTEM AND VEHICLE INCLUDING A LIFTING SYSTEM

(71) Applicant: GM GLOBAL TECHNOLOGY OPERATIONS LLC, Detroit, MI (US)

(72) Inventors: Wonhee M. Kim, Royal Oak, MI (US); Paul W. Alexander, Ypsilanti, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/743,559

(22) Filed: May 13, 2022

(65) Prior Publication Data

US 2023/0363961 A1 Nov. 16, 2023

(51) Int. Cl.
*A61G 3/06* (2006.01)

(52) U.S. Cl.
CPC ............. *A61G 3/062* (2013.01); *A61G 3/067* (2016.11)

(58) Field of Classification Search
CPC . A61G 3/067; A61G 3/062; B60P 1/43; B60P 1/431; B60P 1/433; B60P 1/36; B60P 1/38; B60P 1/4414; B60P 1/4442; B60P 1/445
USPC ................ 414/542, 544, 631, 630, 496, 495
See application file for complete search history.

(56) References Cited

U.S. PATENT DOCUMENTS 5,253,973 A * 10/1993 Fretwell ................. A61G 3/067 414/742
6,929,249 B1 * 8/2005 Kim .......................... B66F 3/35 254/93 H
2010/0329831 A1 * 12/2010 Tornese ................ B60P 1/4435 414/544
2016/0339803 A1 * 11/2016 Beuschel ............. B60N 2/0244
2020/0399080 A1 * 12/2020 Dry ........................ B65G 67/20
2022/0117805 A1 * 4/2022 Toolan ...................... B60R 9/06

* cited by examiner

*Primary Examiner* — Glenn F Myers

(57) ABSTRACT

A lifting system includes a top plate, a bottom plate and N pairs of hinged plates. The N pairs of hinged plates are connected by 2N pairs of hinges to N sides of the top plate and the bottom plate, where N is an integer greater than 2. A bladder is arranged between the top plate and the bottom plate and between inner edges of the N pairs of hinged plates.

14 Claims, 16 Drawing Sheets

LIFTING SYSTEM AND VEHICLE INCLUDING A LIFTING SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to lifting systems and more particularly to lifting systems for vehicles.

Specialized vehicles may include a lifting system to allow a disabled person using a wheelchair or other mobility device to load and unload the wheelchair or other mobility device into or out of a vehicle. The lifting systems are generally expensive to purchase and install, heavy, and generally take up a significant amount of space within the vehicle.

SUMMARY

A lifting system includes a top plate, a bottom plate and N pairs of hinged plates. The N pairs of hinged plates are connected by 2N pairs of hinges to N sides of the top plate and the bottom plate, where N is an integer greater than 2. A bladder is arranged between the top plate and the bottom plate and between inner edges of the N pairs of hinged plates.

In other features, N is equal to 4 and the top plate includes N sides. A compressor is connected to the bladder and is configured to supply fluid to inflate the bladder to move the top plate relative to the bottom plate. An actuator is configured to cause the compressor to fill the bladder. A valve is configured to selectively connect the compressor to the bladder and selectively open to release fluid from the bladder.

In other features, a pump is connected to the bladder and is configured to supply and remove fluid to inflate and deflate the bladder to lift and lower the top plate relative to the bottom plate, respectively. An actuator is configured to cause the pump to fill the bladder. The actuator is configured to cause the pump to remove the fluid from the bladder.

A vehicle comprises the lifting system, first and second track systems, and first and second carriers configured to support the lifting system as the first and second track systems extend the first and second carriers outwardly from a floor surface of the vehicle.

The lifting system is deployed by extending the first and second carriers outwardly from the floor surface of the vehicle to a predetermined distance using the first and second track systems; filling the bladder to cause the bottom plate to lower and raise the top plate off the first and second carriers; and retracting the first and second carriers using the first and second track systems.

In other features, a ramp is configured to deploy in response to the first and second track systems extending the first and second carriers. Each of the first and second track systems include a first wheel, a second wheel, a horizontal member connecting the first wheel to the second wheel, a motor driving at least one of the first wheel and the second wheel, and an endless belt connected around the first wheel and the second wheel.

A vehicle includes the lifting system and first and second track systems configured to support the lifting system as the first and second track systems extend the lifting system outwardly from a floor surface of the vehicle.

In other features, each of the first and second track systems include a first wheel, a second wheel, a horizontal member connecting the first wheel to the second wheel, a motor driving at least one of the first wheel and the second wheel, and an endless belt connected around the first wheel and the second wheel.

In other features, a ramp is configured to hold the lifting system on the first and second track systems as the first and second track systems extend the lifting system from the vehicle.

First and second links are attached to the top plate. The horizontal member of the first track system and the horizontal member of the second track system include a first horizontal channel and a second horizontal channel, respectively. The first horizontal channel and the second horizontal channel include a first vertical opening and a second vertical opening, respectively.

In other features, the first and second horizontal channels are configured to receive and engage the first and second links, respectively, as the top plate of the lifting system is lowered onto the first and second track systems. The first and second horizontal channels are configured to release the first and second links, respectively, as the top plate is raised above a height of the first and second track systems.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
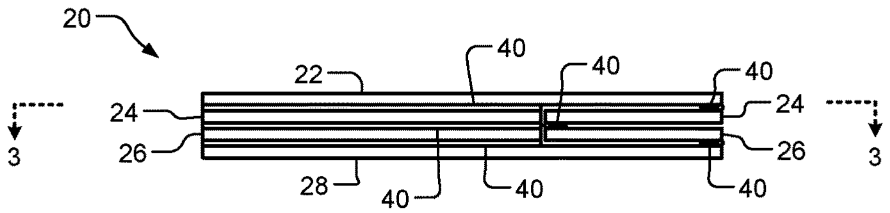
FIG. 1 is a side view of an example of a lifting system according to the present disclosure.

The present disclosure relates to lifting systems that are portable and compact and that can be used for lifting loads. In some examples, the lifting system is used to load and unload wheelchairs or other mobility devices from a vehicle. In other examples, the lifting system can be used as a stand-alone system to lift other types of loads. For example, the lifting system can be used to load and unload objects from a tractor trailer when a loading dock is unavailable.

The lifting systems include a top plate, a bottom plate, hinged plates connected between the top plate and the bottom plate, and a bladder arranged between the top plate and the bottom plate. In some examples for loading and unloading wheelchairs or other mobility devices from a vehicle, the lifting system further includes carriers and/or track systems to extend and retract the lifting system from a floor of the vehicle.

Referring now to FIGS. 1-4B, a lifting system 20 is shown. In FIG. 1-4A, the lifting system 20 includes a top plate 22, N pairs of hinged plates 24 and 26, and a bottom plate 28, where N is an integer greater than 2. Hinges 40 are used to connect the plate 24 in each of the N pairs of hinged plates 24 and 26 to the top plate 22. In some examples, the hinges 40 that connect the plate 24 to the top plate 22 are arranged outwardly adjacent to an outer side surface of the top plate 22.

Hinges 40 are also used to connect the hinged plates 24 and 26 in each of the N pairs of the plates 24 and 26 together. In some examples, the hinges 40 that connect the plates 24 and 26 together are arranged inwardly on inner edges of the pairs of plates 24 and 26.

Hinges 40 are used to connect the plate 26 in each of the N pairs of the hinged plates 24 and 26 to the bottom plate 28. In some examples, the hinges 40 that are used to connect the plate 26 to the bottom plate 28 are arranged outwardly on outer edges of the pairs of plates 24 and 26 adjacent to an outer side surface of the bottom plate 28. As a bladder 50 is selectively inflated with fluid (or deflated), the N pairs of hinged plates 24 and 26 maintain parallelism of the top plate 22 and the bottom plate 28.

Figure 2:
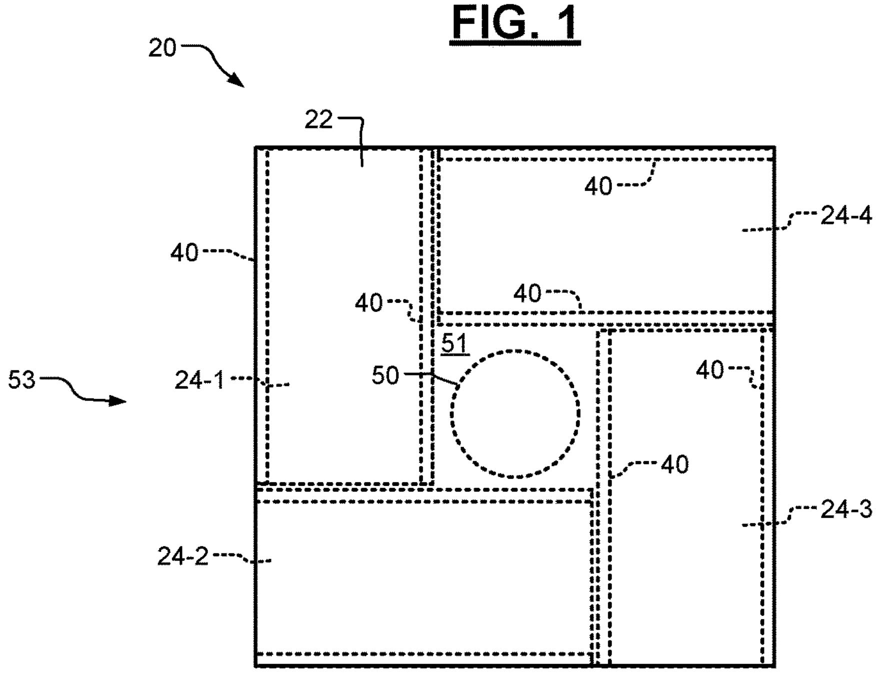
FIG. 2 is a plan view of an example of a lifting system according to the present disclosure.
Figure 3:
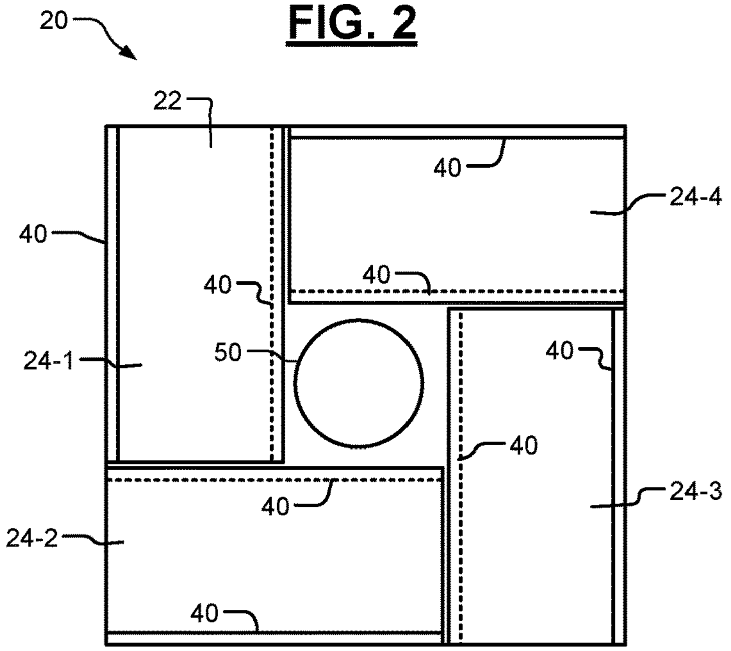
FIG. 3 is a plan view of an example of a middle layer of a lifting system according to the present disclosure.

In the example shown in FIG. 2, the top plate 22 is rectangular. The lifting system 20 includes four pairs of the hinged plates 24 and 26 and three hinges for each pair of plates 24 and 26. More particularly, the plurality of pairs of plates 24 and 26 include plates 24-1 and 26-1, 24-2 and 26-2, 24-3 and 26-3, and 24-4 and 26-4.

A longer side surface of one of the pairs of plates 24 and 26 and a shorter side surface of another one of the pairs of plates 24 and 26 are arranged along respective sides of the lifting system 20. For example, a longer side surface of the pairs of plates 24-1 and 26-1 and a shorter side surface of the pairs of plates 24-2 and 26-2 are arranged along a side surface 53 of the top plate 22. A similar arrangement is used for other side surfaces of the top plate 22.

The bladder 50 is arranged in an interior cavity 51 defined between the pairs of plates 24 and 26. Fluid (liquid or gas) is supplied to (or removed from) the bladder 50 to inflate (or deflate) the bladder 50 to expand to raise (or to lower) the top plate 22 relative to the bottom plate 28.

Figure 4A:
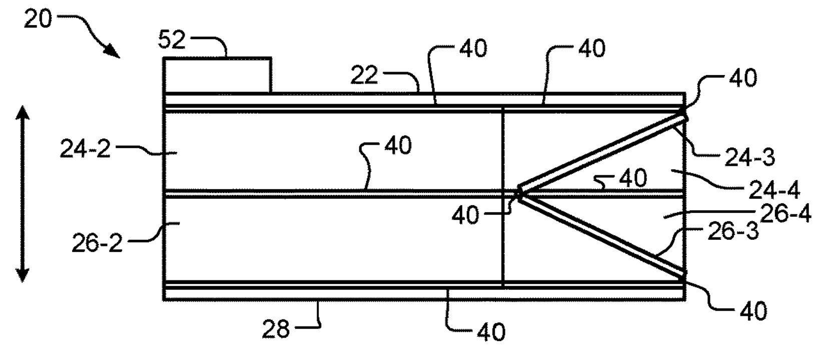
FIG. 4A is a side view of an example of a lifting system in a partially raised state according to the present disclosure.

In FIG. 4A, the bladder 50 is partially inflated by fluid to raise the top plate 22 relative to the bottom plate 28. As the bladder 50 is inflated, the bladder 50 expands against the top plate 22. The angular position of the pairs of plates 24 and 26 changes as the bladder 50 expands or contracts. The pairs of plates 24 and 26 are hinged at one end and opposite ends are connected by hinges to the top plate 22 and the bottom plate 28. The pairs of plates 24 and 26 stabilize the top plate 22 and maintain parallelism between the top plate 22 and the bottom plate 28 while under load as the lifting system 20 moves from a lowered position to a raised position and then returns to the lowered position.

Figure 4B:
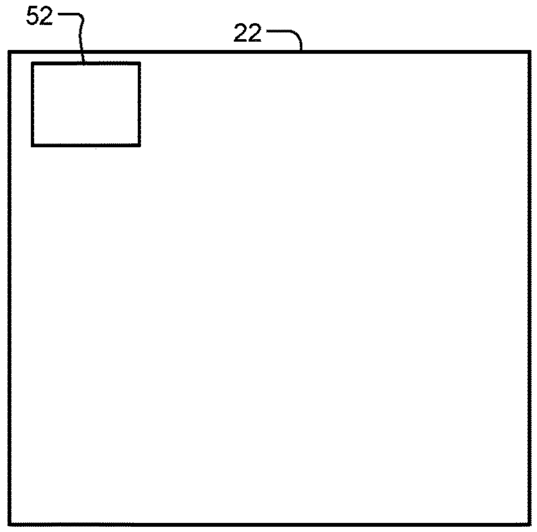
FIG. 4B is a plan view of an example of a lifting system according to the present disclosure.

In FIG. 4B, a housing 52 may be arranged on a top surface of the top plate 22 to house one or more components such as a compressor, a pump, an actuator and/or a power source.

Figure 5:
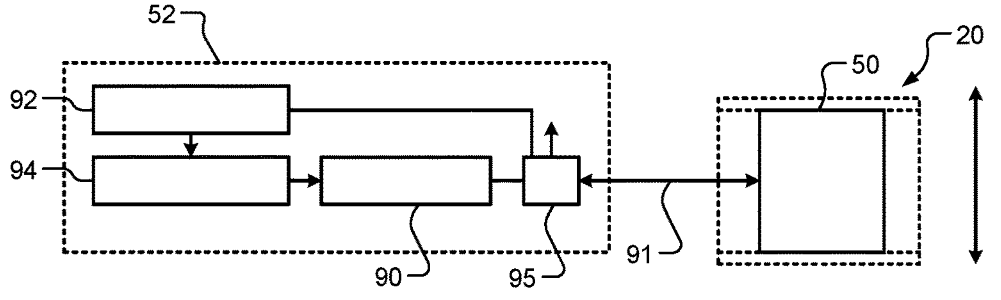
FIG. 5 is a functional block diagram of an example of a pneumatic system for a bladder according to the present disclosure.

Referring now to FIG. 5, an example of a pneumatic system for the bladder 50 is shown. A compressor 90 is connected by a fluid line 91 and a valve 95 to the bladder 50. An actuator 92 is configured to cause a power supply 94 to supply power to the compressor 90 and/or to control the valve 95. When powered, the compressor 90 supplies compressed air to fill the bladder 50.

In some examples, the valve 95 is a three-way valve including a first valve state connecting an output of the compressor 90 to the fluid line 91, a second valve state connecting the fluid line 91 to atmosphere, and a third valve state blocking the fluid line 91. When inflating the bladder 50 to raise the height of the top plate 22, the valve 95 is in the first valve state and the compressor 90 is on. When the top plate 22 is at a desired height or position, the compressor 90 can be turned off and the valve 95 is moved into the third valve state. When the height of the top plate 22 needs to be lowered, the valve 95 is moved into the second valve state to allow air to be released from the bladder 50.

In some examples, the actuator 92 includes a wireless receiver (not shown) that is actuated by a wireless transmitter (not shown). In some examples, a vehicle controller (not shown) controls the actuator 92 wirelessly. In other examples, the actuator 92 is controlled using wired connections.

Figure 6:
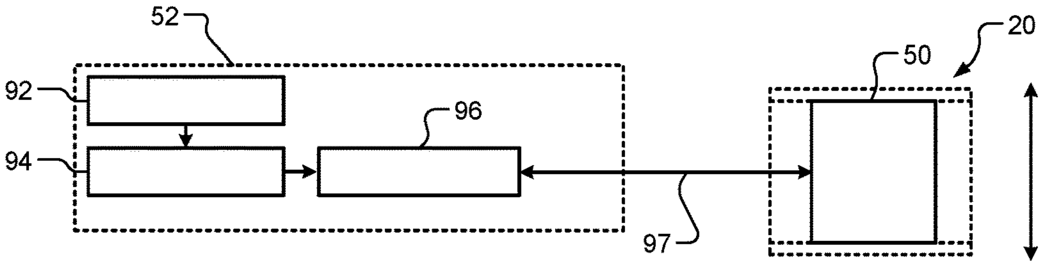
FIG. 6 is a functional block diagram of an example of a hydraulic system for a bladder according to the present disclosure.

Referring now to FIG. 6, a hydraulic system for the bladder 50 is shown. A pump 96 is connected by a fluid line 97 to the bladder 50. The actuator 92 is configured to cause the power supply 94 to supply power to the pump 96. The actuator 92 causes the pump 96 to supply fluid to the bladder 50 or remove fluid from the bladder 50 to adjust the height of the top plate 22.

Figure 7:
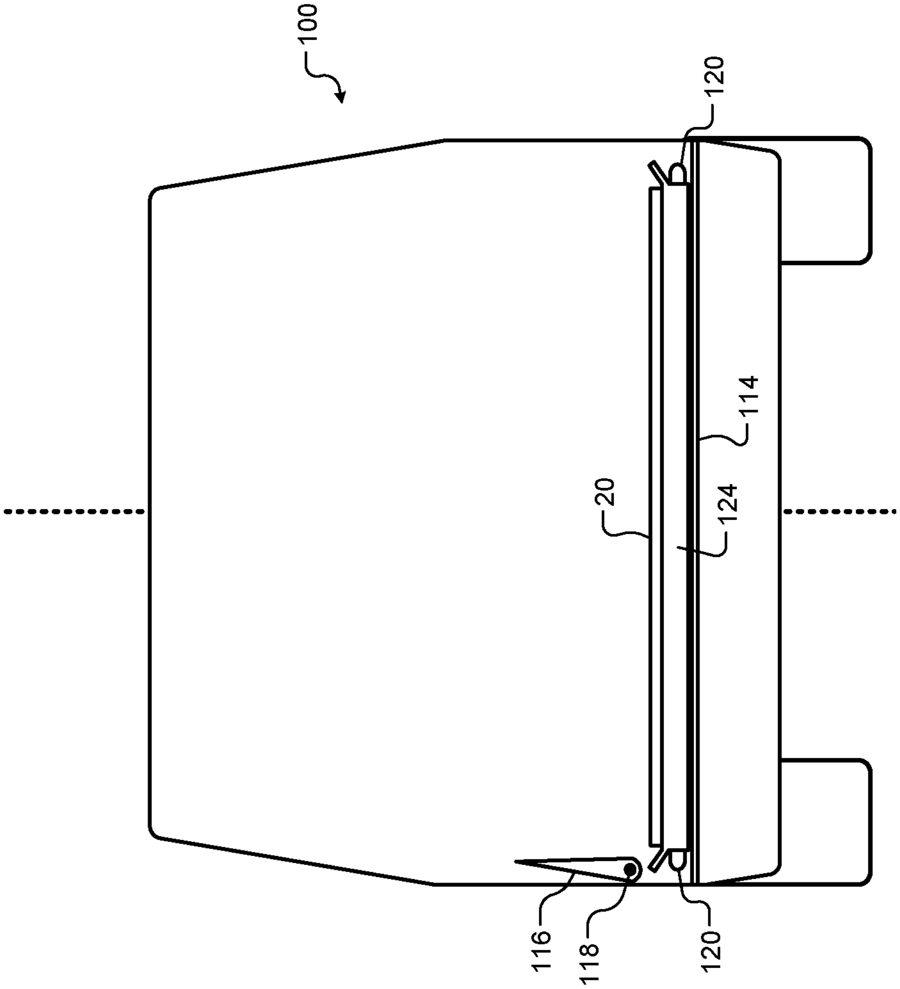
FIGS. 7-11 illustrate operation of a vehicle including the lifting system according to the present disclosure.

Referring now to FIGS. 7-11, the lifting system 20 is shown installed on a surface or floor 114 of a vehicle 100. In FIG. 7, the lifting system 20 is arranged on first and second carriers 124 and is moved horizontally by first and second track systems 120 (both arranged on opposite sides of the lifting system 20). A ramp 116 is rotatable about an axis 118 and is selectively deployed during loading and unloading.

Figure 8:
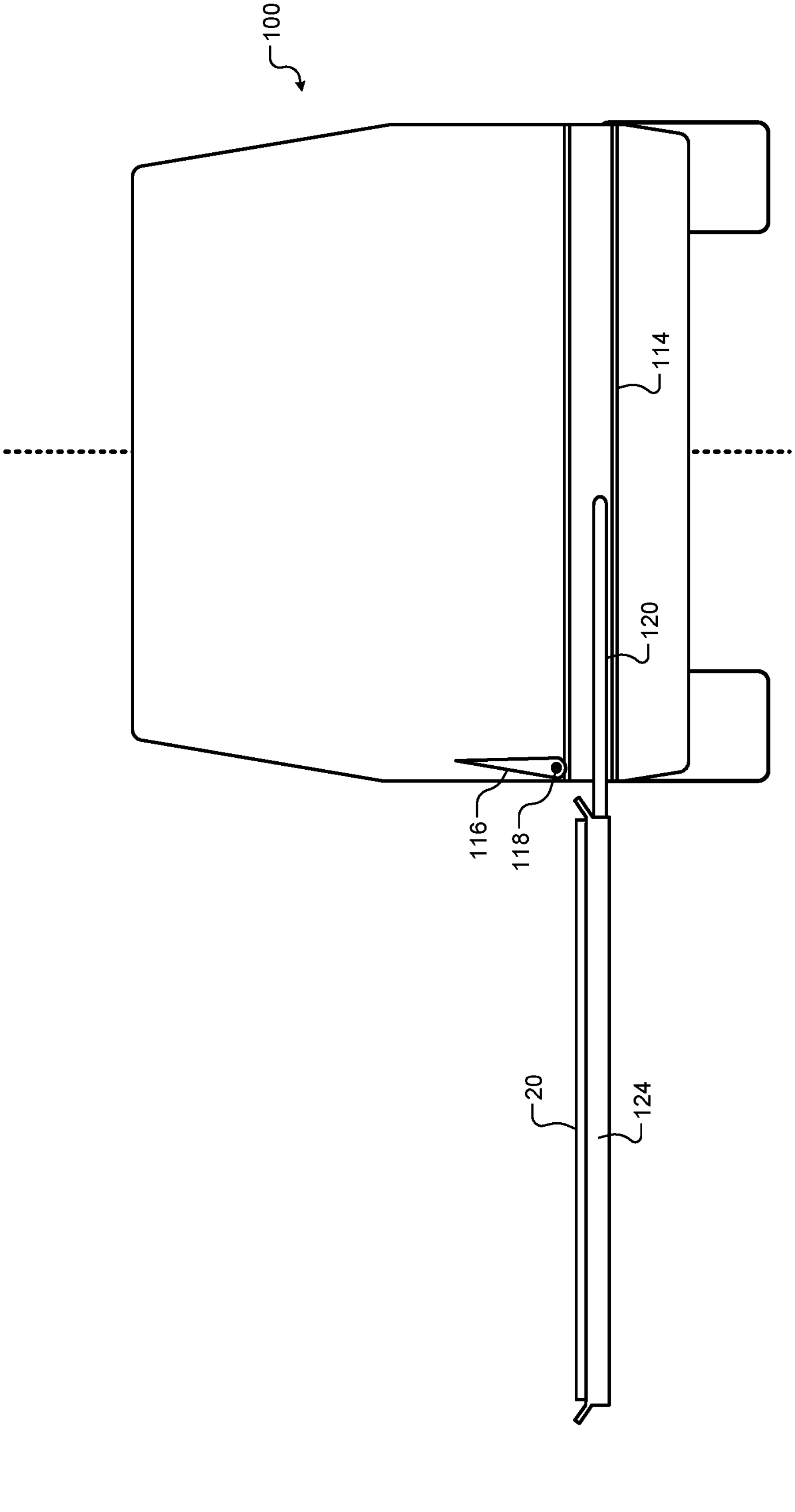

In FIG. 8, the first and second track systems 120 is shown rotated in one direction to move the first and second track systems 120, the first and second carriers 124, and the lifting system 20 horizontally relative to the vehicle 100. In some examples, the first and second carriers 124 and the lifting system 20 move (relative to the vehicle) twice the displacement of the first and second track systems 120.

Figure 9:
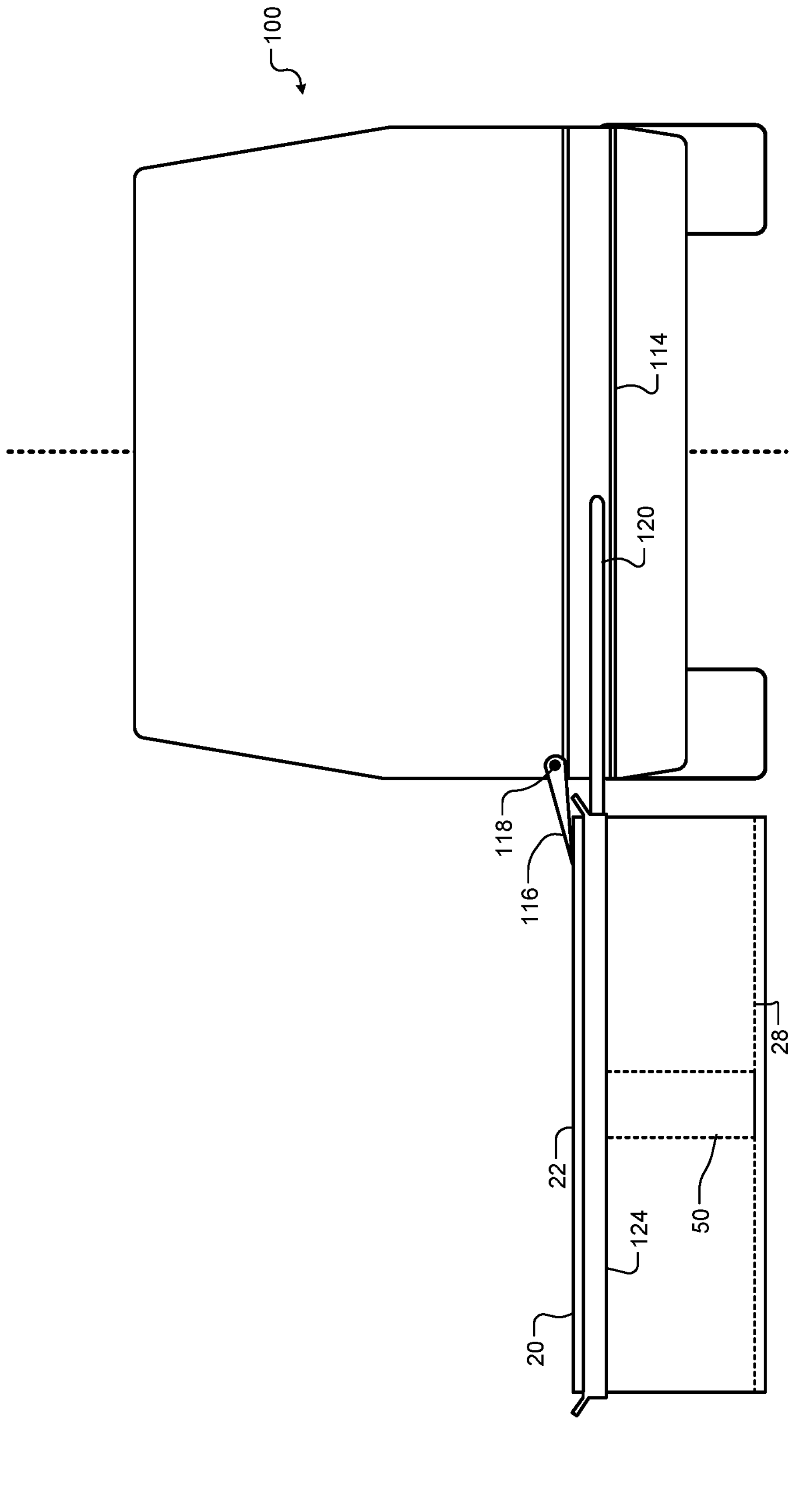
Figure 10:
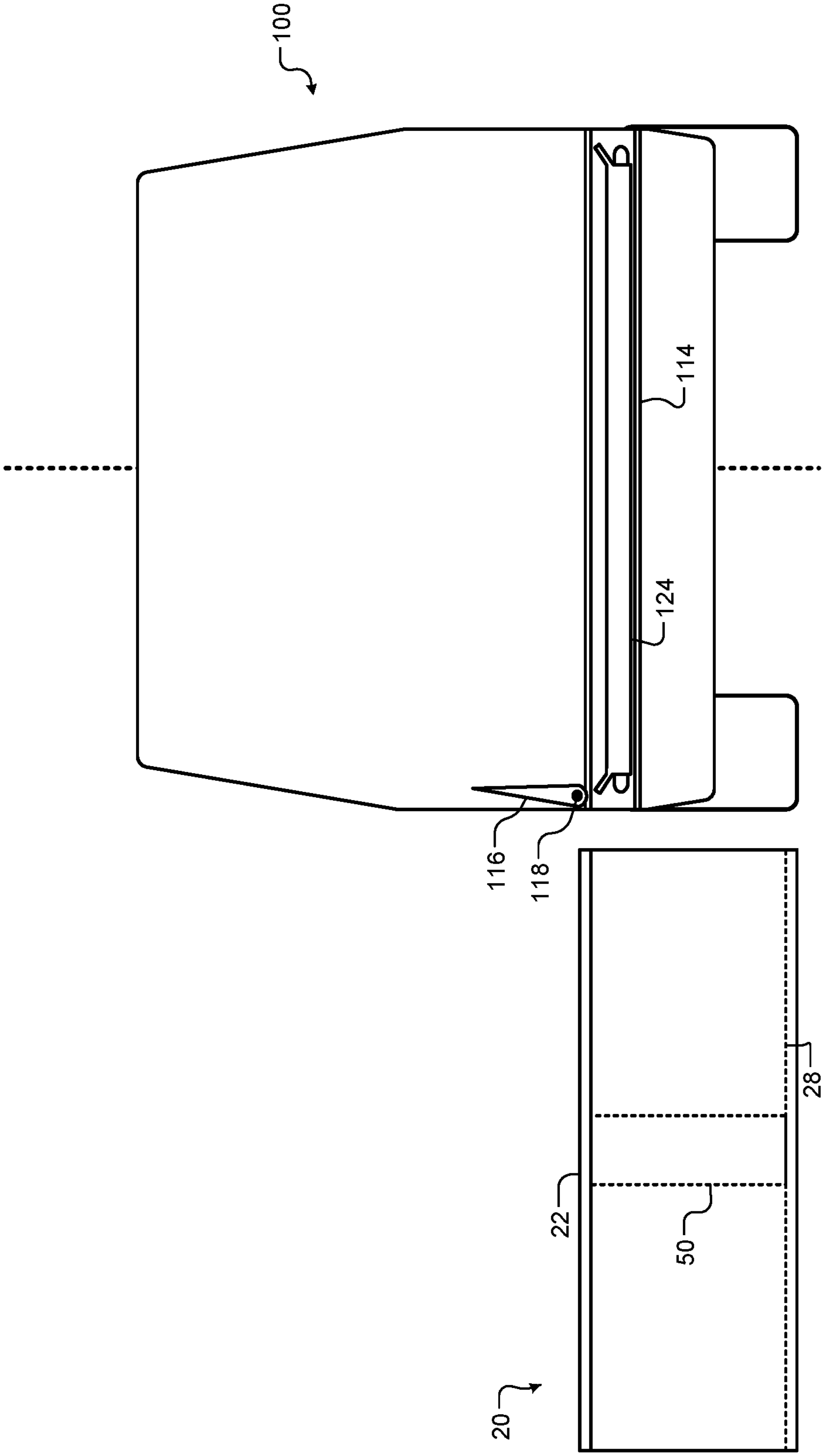
Figure 11:
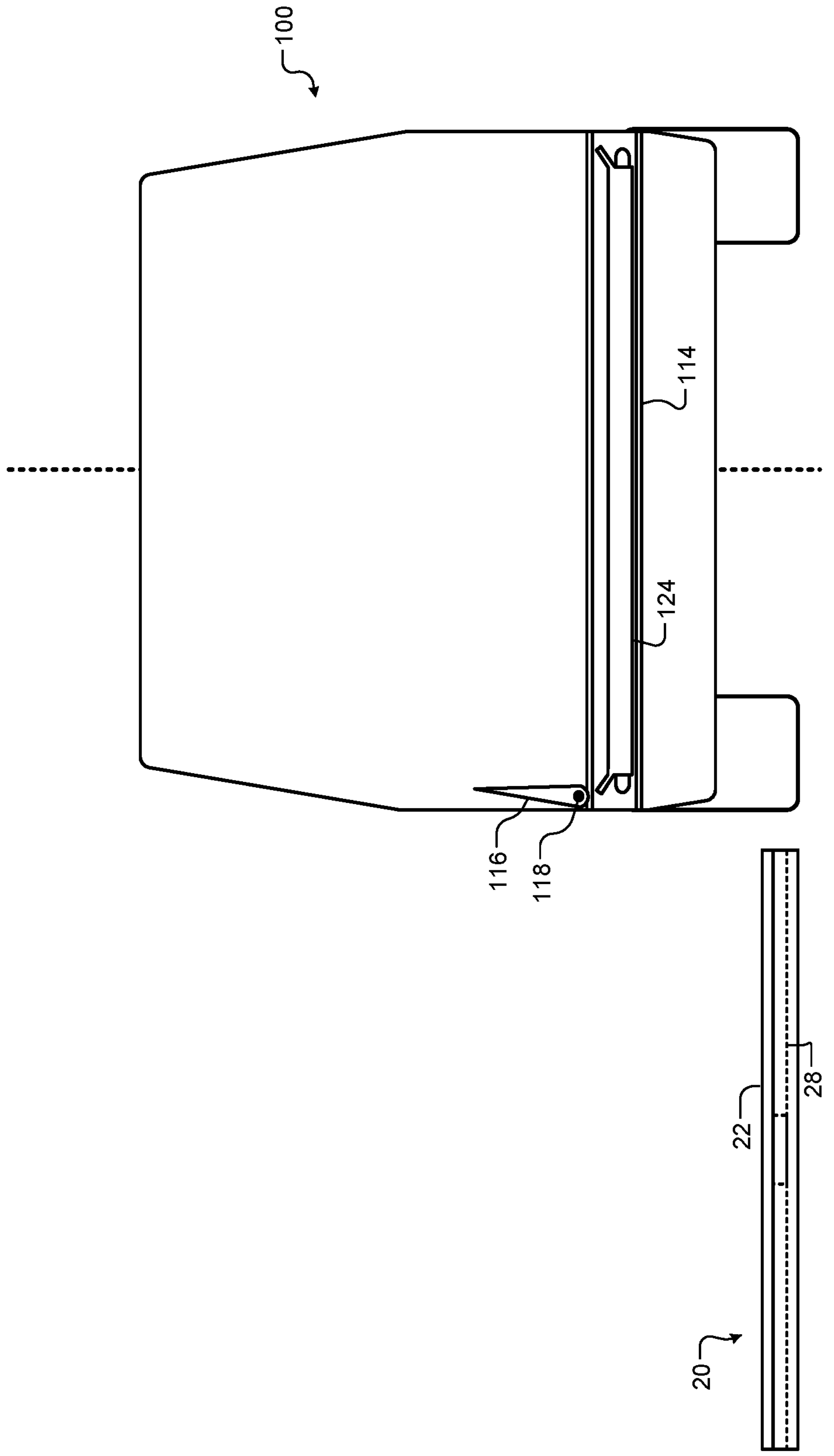

In FIGS. 9 to 11, the bladder 50 in the lifting system 20 is inflated and the bottom surface of the lifting system 20 moves toward the ground. When the bottom surface of the lifting system 20 is in contact with the ground as shown in FIG. 9, the ramp 116 is deployed to allow the wheelchair or other mobility device to exit the vehicle.

The ramp 116 is raised and the bladder 50 is further inflated to lift the top surface of the lifting system 20 above the first and second carriers 124. When the top surface of the lifting system 20 clears the first and second carriers 124 as shown in FIG. 10, the first and second carriers 124 are retracted. Then, the lifting system 20 lowers the top surface to the ground as shown in FIG. 11 and the wheelchair or other mobility device can move off the top plate 22. In some examples, an additional ramp (not shown) may be used to provide a gradual surface from the top plate 22 to the ground.

Figure 12:
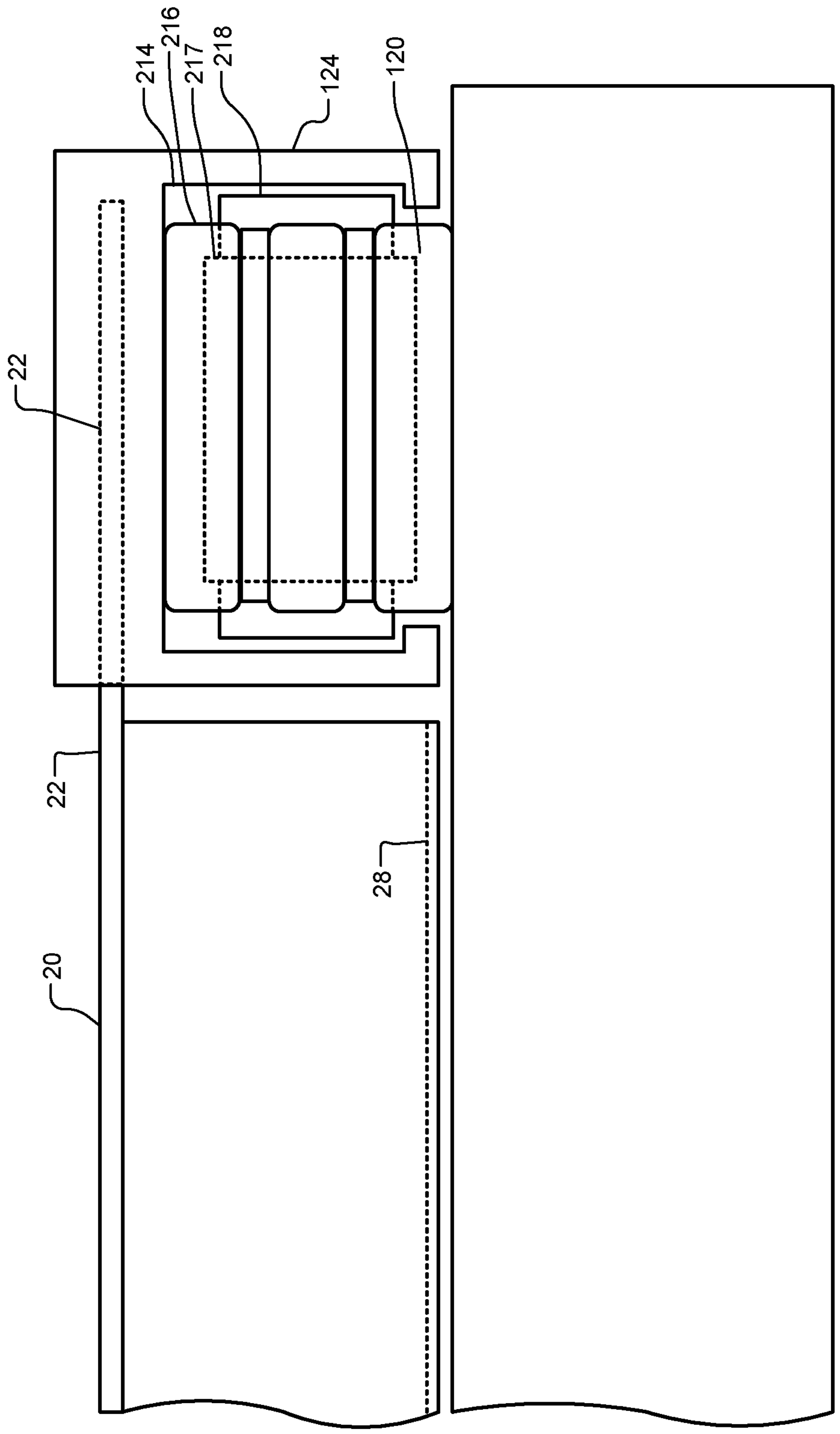
FIG. 12 is a side view of an example of a lifting system, a carrier, and a track system according to the present disclosure.

Referring now to FIG. 12, an example of the lifting system 20, the first and second carriers 124, and the first and second track systems 120 are shown. The first and second track systems 120 include endless belts 216 mounted on wheels 217 that are connected by horizontal members 218. In some examples, the first and second carriers 124 have downwardly-facing "C"-shaped cross-sections and openings 214 configured to allow the first and second track systems 120 to pass there through.

Figure 13A:
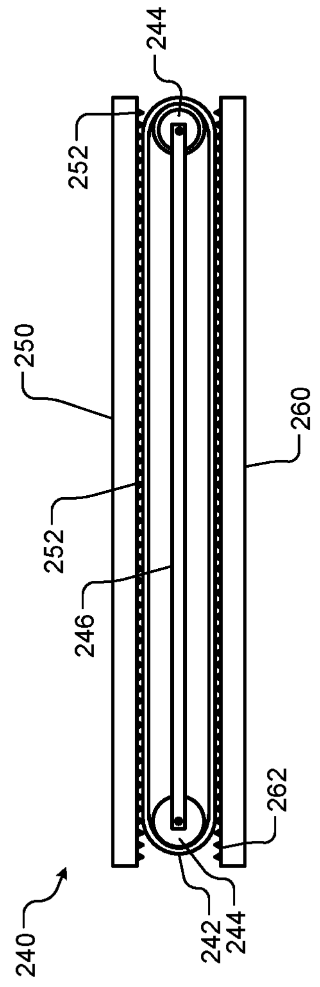
FIGS. 13A and 13B are side views of another example of a track system according to the present disclosure.
Figure 13B:
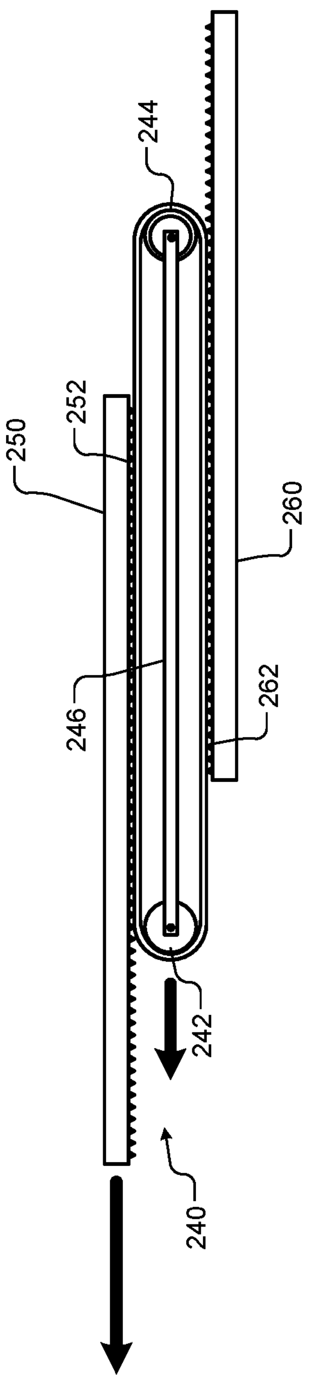

Referring now to FIGS. 13A and 13B, another example of a track system 240 is shown. In FIG. 13A, the track system 240 includes endless belts such as chains 242 mounted on wheels such as sprockets 244. The sprockets 244 are rotatably connected by horizontal members 246. One or more motors (not shown) drive one or both of the sprockets 244. A top plate 250 of the lifting system includes a bottom surface including teeth 252 that engage the chains 242. A floor surface 260 of the vehicle includes teeth 262 that engage the chains 242. In FIG. 13B, the track system 240 moves the top plate 250 horizontally as described above.

Figure 14:
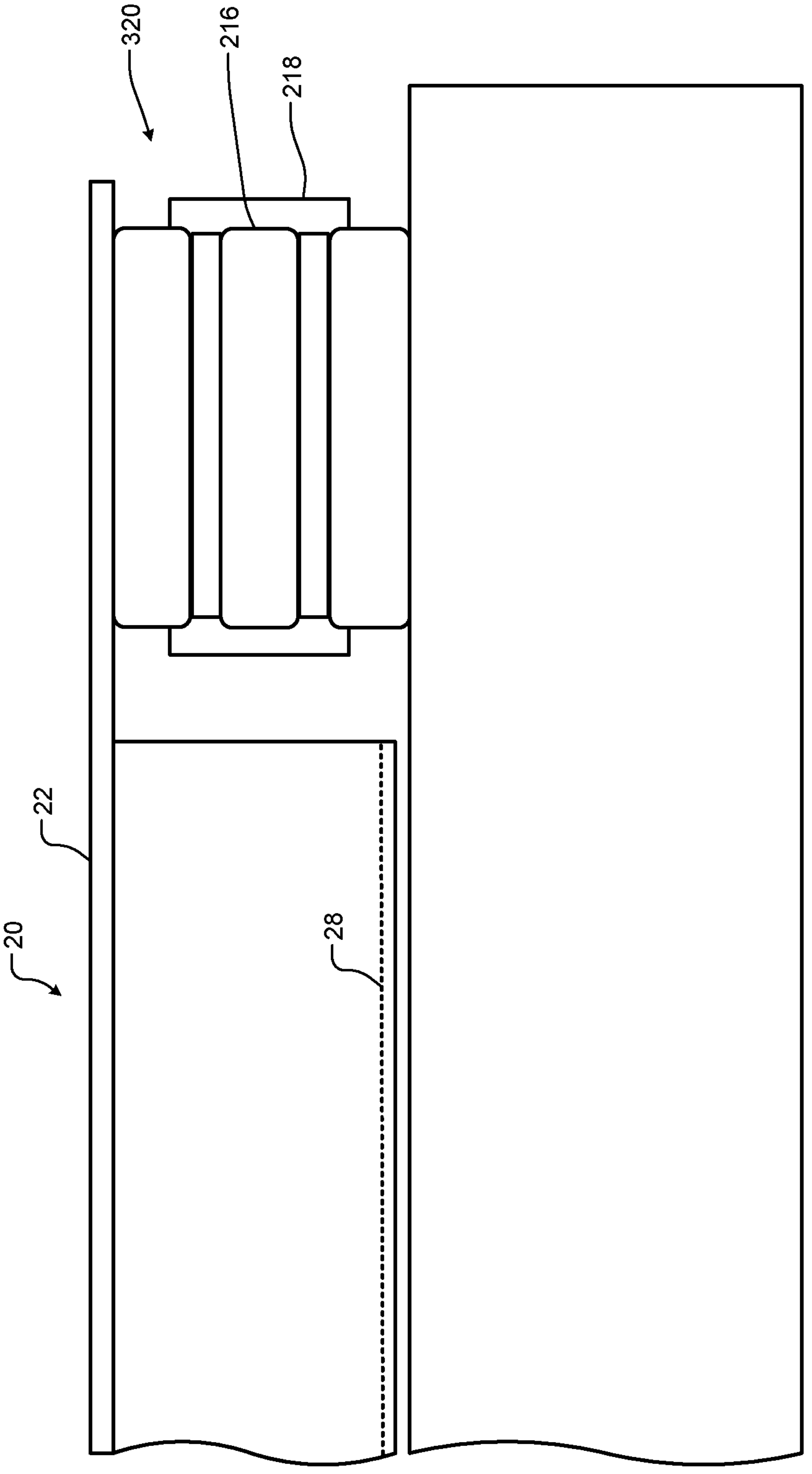
FIGS. 14-18 illustrate operation of a vehicle including another example of a lifting system according to the present disclosure.
Figure 15:
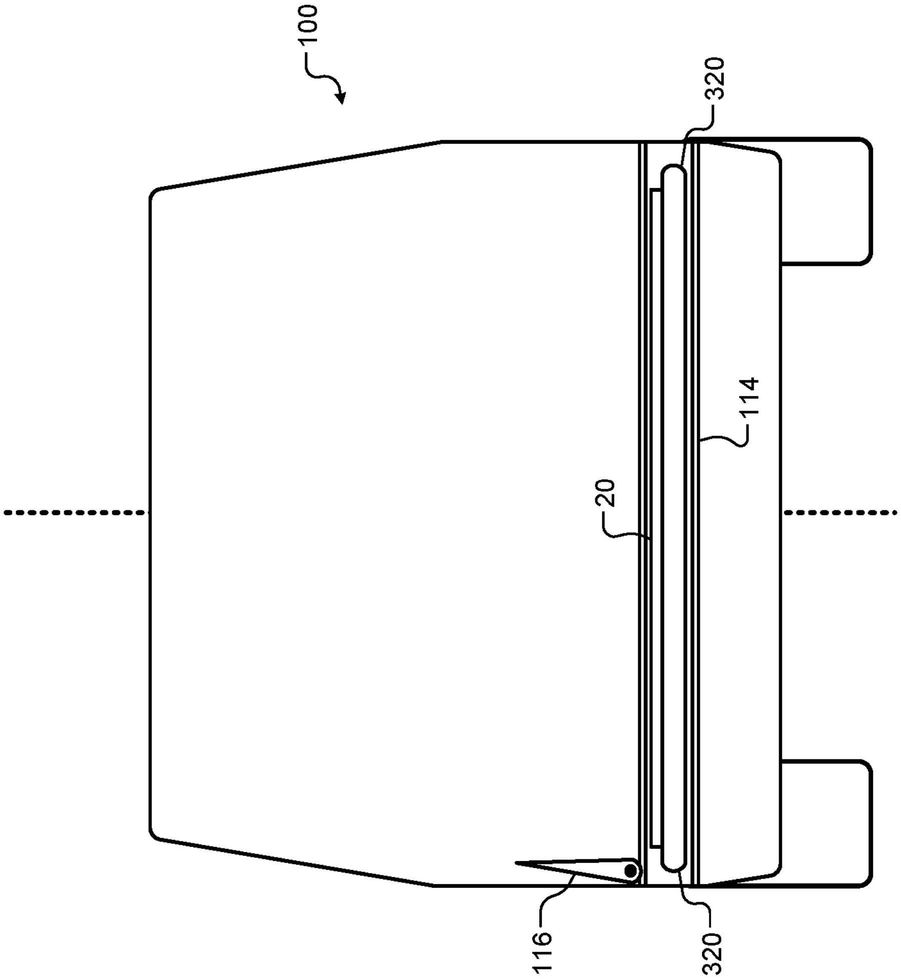
Figure 16:
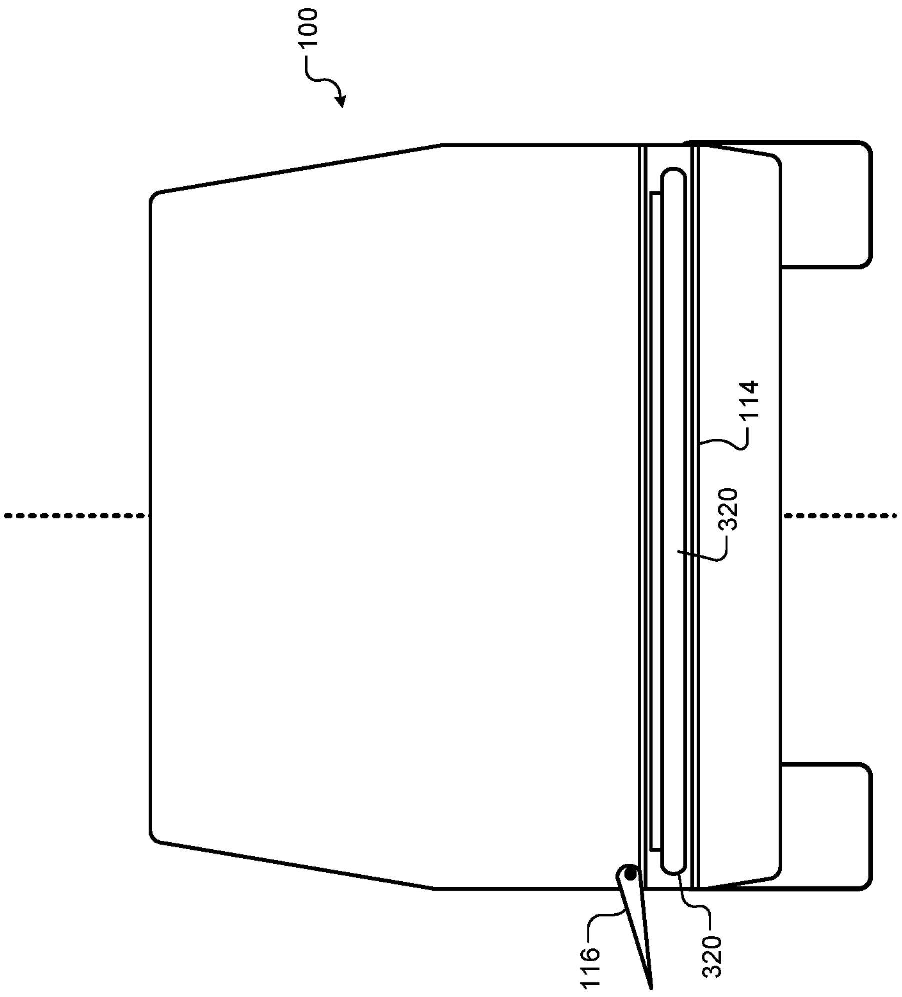

Referring now to FIGS. 14-18, another example of a lifting system 20 is shown. In FIGS. 14 and 15, the lifting system 20 rests directly on first and second track systems 320 and the carriers are omitted. The first and second track systems 320 rotate in one direction to move the first and second track systems 320 and the lifting system 20 horizontally relative to the vehicle. In some examples, the lifting system 20 is moved by a distance (relative to the vehicle) that is twice the displacement of the first and second track systems 320. In FIG. 15, the first and second track systems 320 and the lifting system 20 are arranged on the floor 114 of the vehicle.

Figure 17:
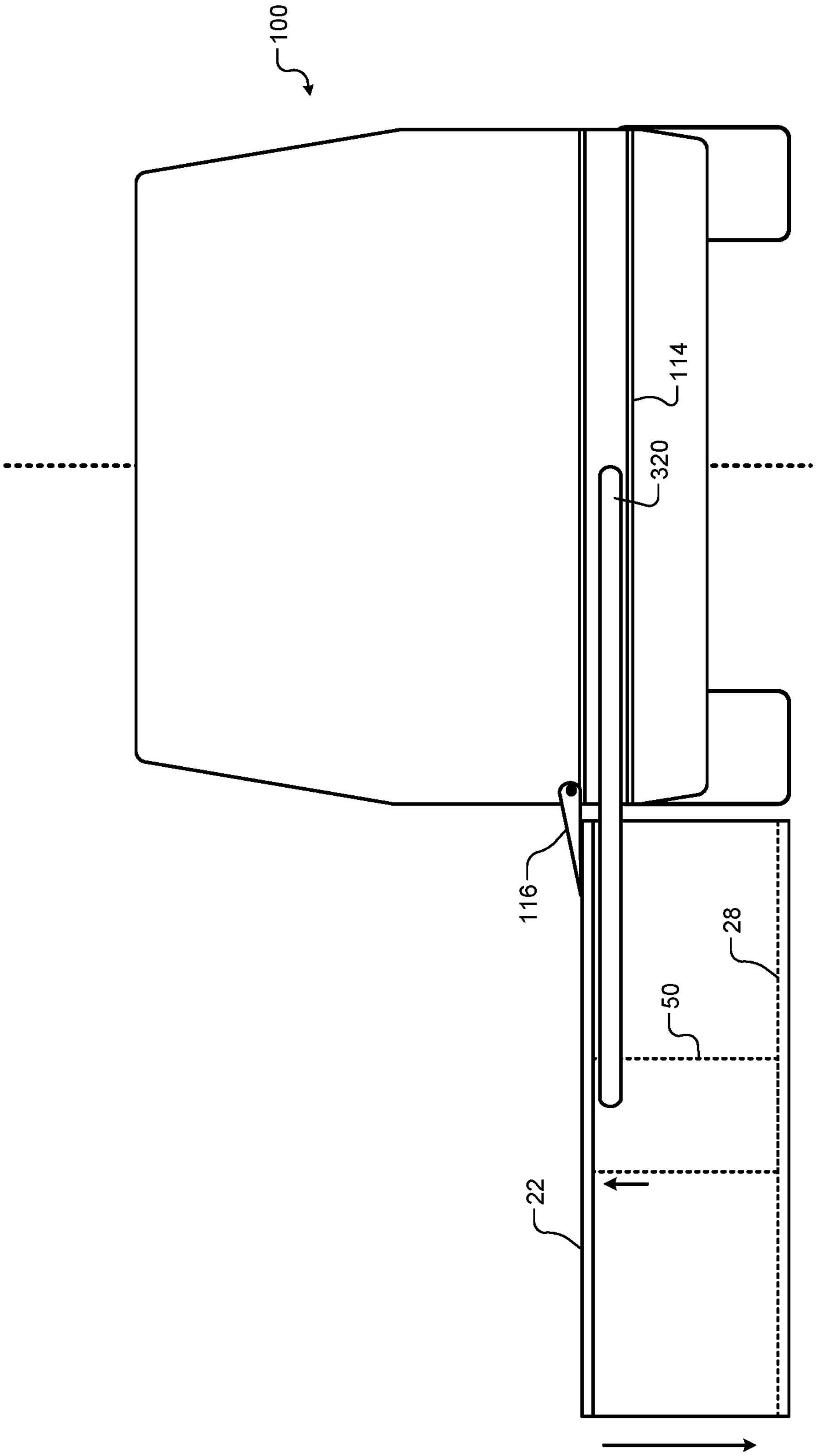
Figure 18:
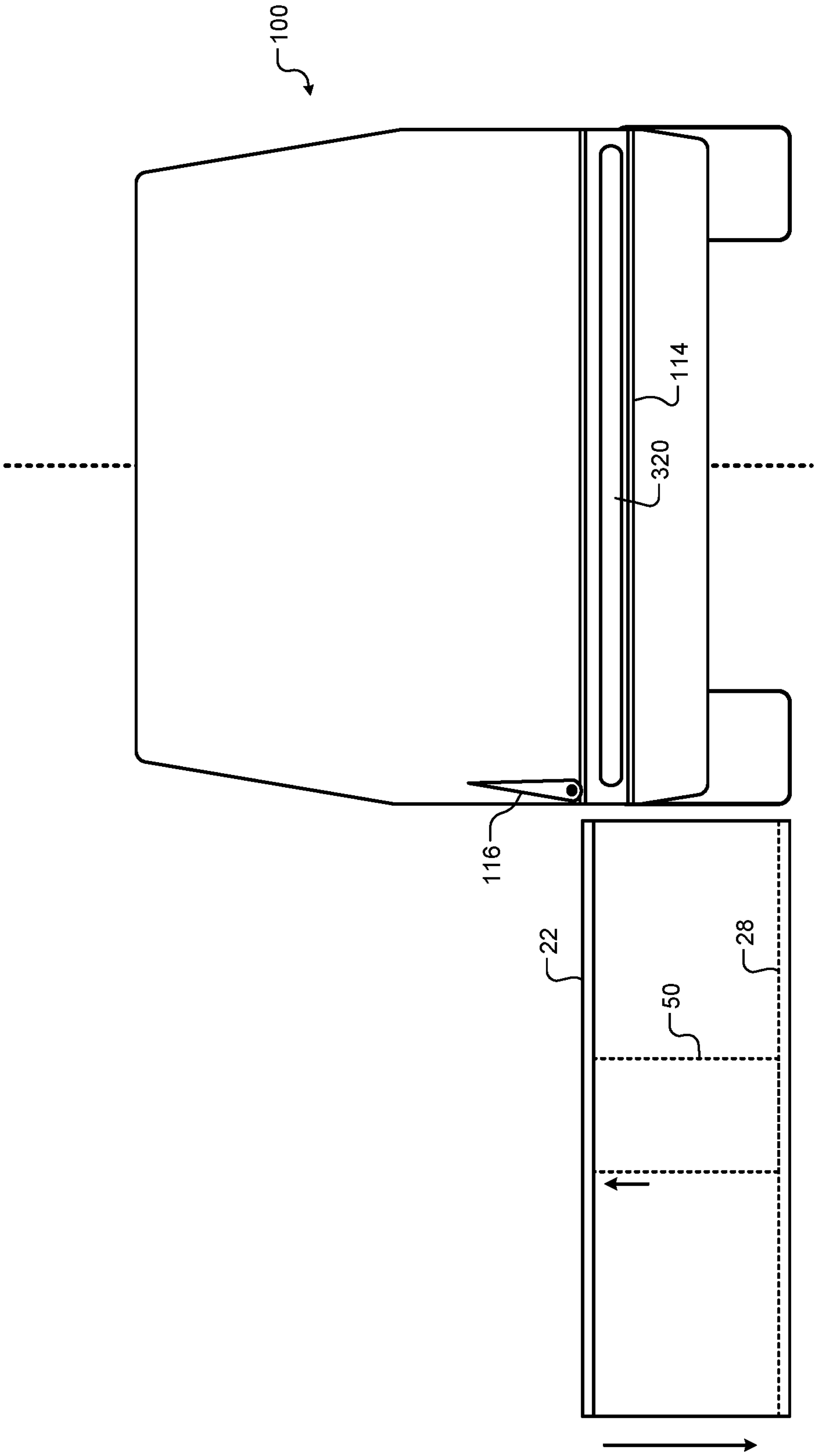

The ramp 116 is deployed (FIG. 16) and then the first and second track systems 320 rotate in one direction to move the first and second track systems 320 and the lifting system 20 horizontally relative to the vehicle while the ramp 116 holds the lifting system 20 on the first and second track systems 320 (FIG. 17). When the lifting system 20 clears the vehicle, the bladder 50 is inflated and the bottom plate 28 moves towards the ground. When the lifting system 20 is on the ground, the wheelchair or other mobility device can exit the vehicle onto the lifting system. The ramp is lifted and the first and second track systems 320 are retracted (FIG. 18). The lifting system 20 lowers the wheelchair or other mobility device to the ground.

Figure 19:
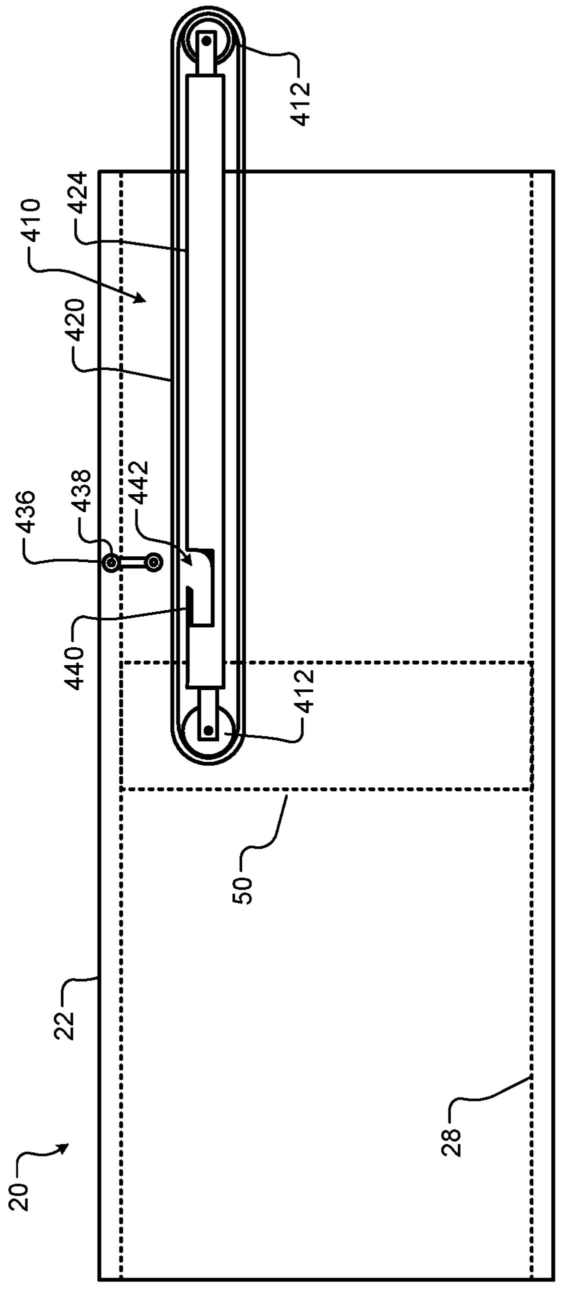
FIGS. 19-22 are side views illustrating another example of a track system including channels and links attached to the lifting system according to the present disclosure.

Referring now to FIGS. 19-22, another example of first and second track systems 410 for the lifting system 20 is shown. In FIG. 19, the first and second track systems 410 include wheels 412, horizontal members 424 extending between the wheels 412, and endless belts or chains 420 arranged around the wheels 412. The lifting system 20 includes links 436 that are pivotably mounted about axes 438 on side surfaces thereof. While one link is shown per side, two or more links can be used on each side. The horizontal members 424 of the first and second track system 410 include channels 440 configured to removably receive the links 436. The channels 440 include upper openings 442 that are wider than a width of the links 436. The channels 440 are longer than the length of the links 436.

Figure 20:
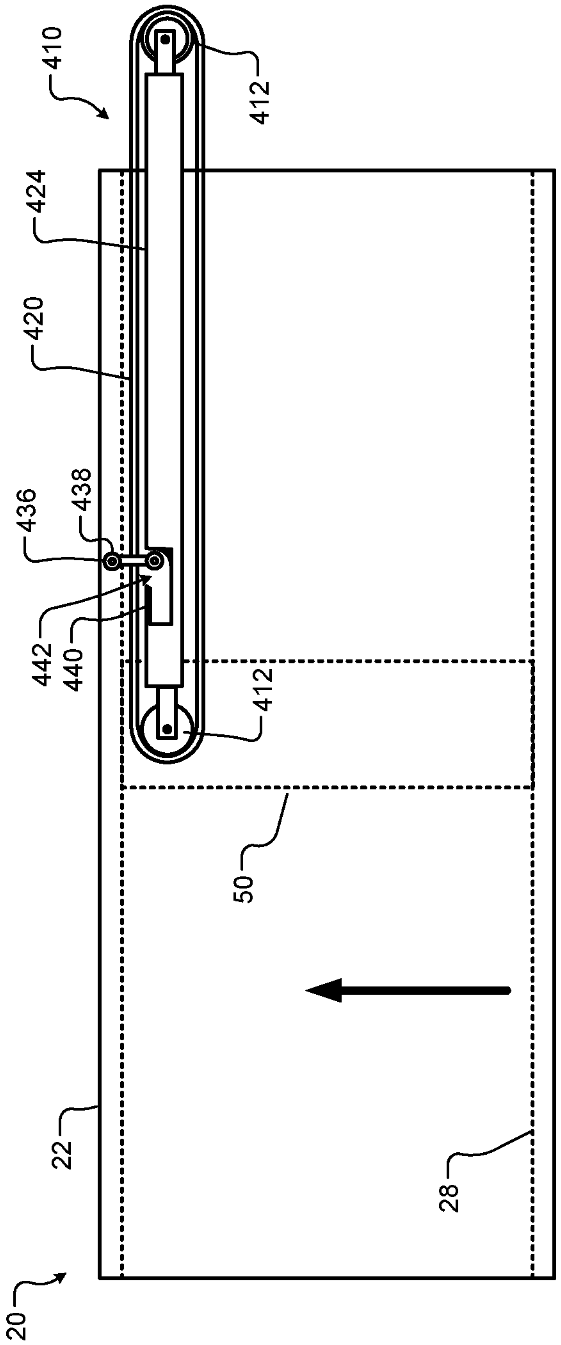
Figure 21:
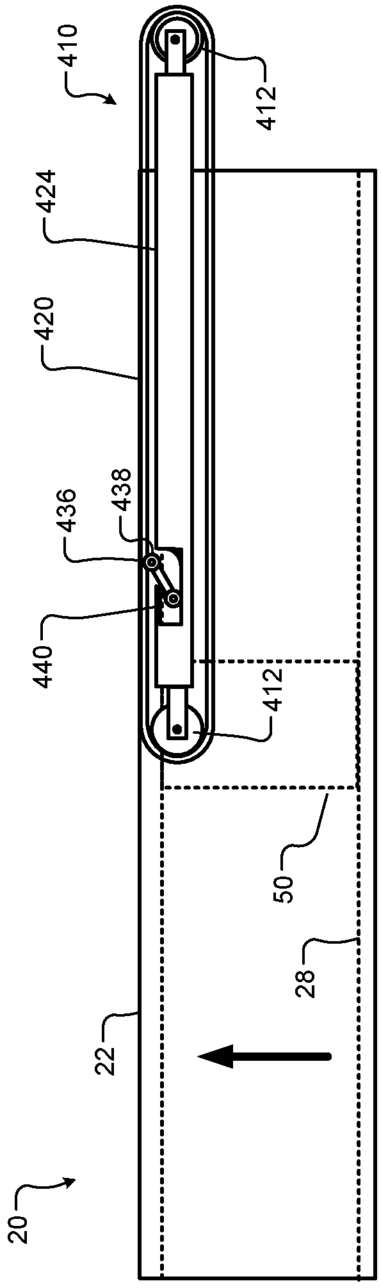
Figure 22:
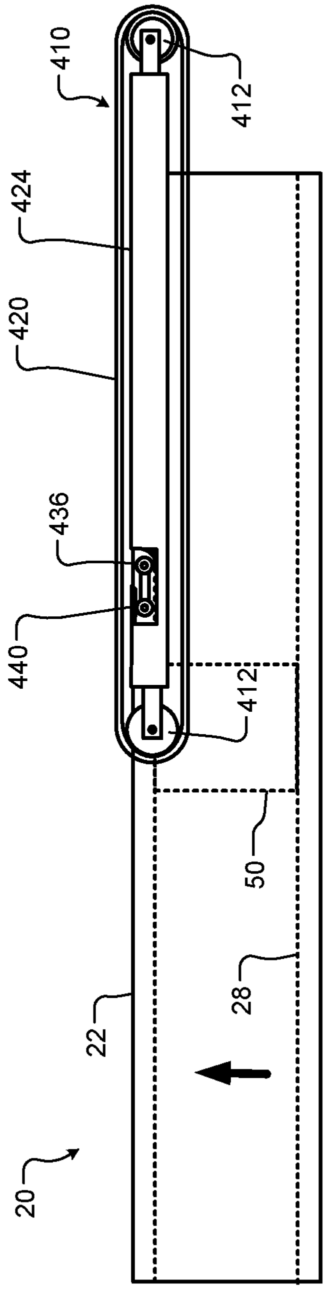

The lifting system 20 is shown in a raised position in FIG. 19 corresponding to higher pressure in the bladder 50 and the first and second track systems 410 are extended. As pressure in the bladder 50 in the lifting system 20 is reduced, the top surface of the lifting system 10 moves downwardly and the links 436 enter the upper openings 442 of the channels 440 in a vertical direction as shown in FIG. 20. As the top surface moves further downwardly, ends of the links 436 rotate and move horizontally into the channels 440 as shown in FIGS. 21 and 22. The operation is reversed when unloading the lifting system 20.

Once the links 436 are seated as shown in FIG. 22, the links 436 prevent rotational motion of the lifting system 20 as the lifting system 20 loses contact with the ground. Therefore, the links 436 prevent tipping of the lifting system 20 off the first and second track systems 410. The mechanical interference of the links 436 (when they are vertically loaded) cannot accommodate the arc-shaped travel path created by tipping. When the lifting system is moved vertically, the top surface of the lifting system extends above the first and second track systems 410 when the bladder reaches full inflation and the links 436 move out of the channel 440.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In otherwords, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A vehicle comprising:

a lifting system comprising:

a top plate;

a bottom plate;

N pairs of hinged plates, wherein the N pairs of hinged plates are connected by 2N pairs of hinges to N sides of the top plate and the bottom plate, where N is an integer greater than 2;

a bladder arranged between the top plate and the bottom plate and between inner edges of the N pairs of hinged plates; and first and second track systems including:

a first wheel;

a second wheel;

a horizontal member connecting the first wheel to the second wheel;

a motor driving at least one of the first wheel and the second wheel; and an endless belt connected around the first wheel and the second wheel, wherein the first and second track systems extend the lifting system outwardly from a floor surface of the vehicle; and a ramp configured to hold the lifting system on the first and second track systems as the first and second track systems extend the lifting system from the vehicle.

2. The vehicle of claim 1, wherein N is equal to 4 and wherein the top plate includes N sides.

3. The vehicle of claim 1, wherein the lifting system further comprises:

a compressor connected to the bladder and configured to supply fluid to inflate the bladder to move the top plate relative to the bottom plate; and an actuator configured to cause the compressor to fill the bladder.

4. The vehicle of claim 3, wherein the lifting system further comprises a valve configured to selectively connect the compressor to the bladder and selectively open to release fluid from the bladder.

5. The vehicle of claim 1, wherein the lifting system further comprises a pump connected to the bladder and configured to supply and remove fluid to inflate and deflate the bladder to lift and lower the top plate relative to the bottom plate, respectively.

6. The vehicle of claim 5, wherein the lifting system further comprises an actuator configured to cause the pump to fill the bladder.

7. The vehicle of claim 6, wherein the actuator is configured to cause the pump to remove the fluid from the bladder.

8. The vehicle of claim 1 further comprising:

first and second carriers configured to support the lifting system as the first and second track systems extend the first and second carriers outwardly from a floor surface of the vehicle.

9. The vehicle of claim 8, wherein the lifting system is deployed by:

extending the first and second carriers outwardly from the floor surface of the vehicle to a predetermined distance using the first and second track systems;

filling the bladder to cause the bottom plate to lower and raise the top plate off the first and second carriers; and retracting the first and second carriers using the first and second track systems.

10. The vehicle of claim 9, wherein the ramp is configured to deploy in response to the first and second track systems extending the first and second carriers.

11. The vehicle of claim 1, further comprising:

first and second links attached to the top plate, wherein the horizontal member of the first track system and the horizontal member of the second track system include a first horizontal channel and a second horizontal channel, respectively, and wherein the first horizontal channel and the second horizontal channel include a first vertical opening and a second vertical opening, respectively.

12. The vehicle of claim 11, wherein the first and second horizontal channels are configured to receive and engage the first and second links, respectively, as the top plate of the lifting system is lowered onto the first and second track systems, and wherein the first and second horizontal channels are configured to release the first and second links, respectively, as the top plate is raised above a height of the first and second track systems.

13. A lifting system for a vehicle, comprising:

a top plate;

a bottom plate;

N pairs of hinged plates, wherein the N pairs of hinged plates are connected by 2N pairs of hinges to N sides of the top plate and the bottom plate, where N is an integer greater than 2;

a bladder arranged between the top plate and the bottom plate between inner edges of the N pairs of hinged plates;

first and second track systems including:

a first wheel, a second wheel, a horizontal member connecting the first wheel to the second wheel, a motor driving at least one of the first wheel and the second wheel, and an endless belt connected around the first wheel and the second wheel; and first and second carriers configured to support the lifting system as the first and second track systems extend the first and second carriers outwardly from a floor surface of the vehicle, wherein the lifting system is deployed by:

extending the first and second carriers outwardly from the floor surface of the vehicle using the first and second track systems;

filling the bladder to cause the bottom plate to lower and raise the top plate off the first and second carriers; and retracting the first and second carriers using the first and second track systems.

14. A lifting system for a vehicle comprising:

a top plate having N sides, where N is an integer greater than 3;

a bottom plate having N sides;

N pairs of hinged plates, wherein the N pairs of hinged plates are connected by 2N pairs of hinges to the N sides of the top plate and the bottom plate, where N is an integer greater than 1;

a bladder arranged between the top plate and the bottom plate between inner edges of the N pairs of hinged plates;

first and second track systems configured to extend the lifting system outwardly from a floor surface of the vehicle, wherein each of the first and second track systems include:

a first wheel;

a second wheel;

a horizontal member connecting the first wheel to the second wheel;

a motor driving at least one of the first wheel and the second wheel; and an endless belt connected around the first wheel and the second wheel; and wherein the lifting system is deployed by:

extending the lifting system outwardly from the floor surface of the vehicle to a predetermined distance using the first and second track systems;

filling the bladder to cause the bottom plate of the lifting system to lower and raise the top plate off the first and second track systems; and retracting the first and second track systems.

* * * * *